US009082414B2

(12) United States Patent
Talwar et al.

(10) Patent No.: US 9,082,414 B2
(45) Date of Patent: Jul. 14, 2015

(54) CORRECTING UNINTELLIGIBLE SYNTHESIZED SPEECH

(75) Inventors: Gaurav Talwar, Farmington Hills, MI (US); Rathinavelu Chengalvarayan, Naperville, IL (US)

(73) Assignee: General Motors LLC, Detroit, MI (US)

( * ) Notice: Subject to any disclaimer, the term of this patent is extended or adjusted under 35 U.S.C. 154(b) by 525 days.

(21) Appl. No.: 13/246,131

(22) Filed: Sep. 27, 2011

(65) Prior Publication Data

US 2013/0080173 A1 Mar. 28, 2013

(51) Int. Cl.

| | |
|---|---|
| ***G10L 13/00*** | (2006.01) |
| ***G10L 13/08*** | (2013.01) |
| ***G10L 15/22*** | (2006.01) |
| ***G10L 25/69*** | (2013.01) |
| ***G10L 13/033*** | (2013.01) |

(52) U.S. Cl.

CPC ............... *G10L 25/69* (2013.01); *G10L 13/033* (2013.01)

(58) Field of Classification Search

CPC ....... G10L 13/00; G10L 13/02; G10L 13/027; G10L 13/033; G10L 13/08; G10L 13/10; G10L 21/00; G10L 21/007; G10L 21/01; G10L 21/013; G10L 21/0202; G10L 21/0205; G10L 21/0316; G10L 21/0324; G10L 21/0364; G10L 25/69; G10L 2013/08; G10L 2015/06; G10L 2015/063

USPC ....................... 704/256–260, 270, 270.1, 275

See application file for complete search history.

(56) References Cited

U.S. PATENT DOCUMENTS

| | | | | |
|---|---|---|---|---|
| 5,806,028 | A * | 9/1998 | Lyberg | 704/231 |
| 6,889,186 | B1 * | 5/2005 | Michaelis | 704/225 |
| 2002/0128838 | A1 | 9/2002 | Veprek | |
| 2002/0184030 | A1 | 12/2002 | Brittan et al. | |
| 2004/0243412 | A1 * | 12/2004 | Gupta et al. | 704/254 |
| 2005/0114127 | A1 * | 5/2005 | Rankovic | 704/233 |

(Continued)

FOREIGN PATENT DOCUMENTS

| | | | |
|---|---|---|---|
| CN | 1549999 | A | 11/2004 |
| EP | 1 081 589 | * | 3/2001 |

OTHER PUBLICATIONS

Moller et al and T. Polzehl. Comparison of Approaches for Instrumentally Prediction the Quality of Text-to-Speech Systems. Proc. International Conference on Spoken Language Processing (Interspeech 2010—ICSLP), 2010.*

(Continued)

*Primary Examiner* — Edgar Guerra-Erazo

(74) *Attorney, Agent, or Firm* — Anthony Luke Simon; Reising Ethington P.C.

(57) ABSTRACT

A method and system of speech synthesis. A text input is received in a text-to-speech system and, using a processor of the system, the text input is processed into synthesized speech which is established as unintelligible. The text input is reprocessed into subsequent synthesized speech and output to a user via a loudspeaker to correct the unintelligible synthesized speech. In one embodiment, the synthesized speech can be established as unintelligible by predicting intelligibility of the synthesized speech, and determining that the predicted intelligibility is lower than a minimum threshold. In another embodiment, the synthesized speech can be established as unintelligible by outputting the synthesized speech to the user via the loudspeaker, and receiving an indication from the user that the synthesized speech is not intelligible.

20 Claims, 4 Drawing Sheets

(56) References Cited

U.S. PATENT DOCUMENTS

| | | | | |
|---|---|---|---|---|
| 2006/0270467 | A1* | 11/2006 | Song et al. | 455/570 |
| 2007/0106513 | A1* | 5/2007 | Boillot et al. | 704/260 |
| 2009/0259475 | A1* | 10/2009 | Yamagami et al. | 704/276 |

OTHER PUBLICATIONS

Talwar, G.; Kubichek, R.F.; Hongkang Liang, “Hiddenness Control of Hidden Markov Models and Application to Objective Speech Quality and Isolated-Word Speech Recognition,” Signals, Systems and Computers, 2006. ACSSC ’06. Fortieth Asilomar Conference on , vol., no., pp. 1076,1080, Oct. 29, 2006-Nov. 1, 2006.*

Falk, “Blind estimation of perceptual quality for modern speech communications,” Dec. 2008, Ph.D. dissertation, Queen’s University, Kingston, Ontario, Canada, Dec. 2008, pp. i-192.*

Falk, T.H.; Moller, S., “Towards Signal-Based Instrumental Quality Diagnosis for Text-to-Speech Systems,” Signal Processing Letters, IEEE , vol. 15, no., pp. 781,784, 2008.*

L. Malfait, J. Berger, and M. Kastner, “P.563-The ITU-T standard for single-ended speech quality assessment,” IEEE Trans. Audio, Speech, Lang. Process., vol. 14, No. 6, pp. 1924-1934, Nov. 2006.*

Yamagishi, J.; Kobayashi, T.; Nakano, Y.; Ogata, K.; Isogai, J., “Analysis of Speaker Adaptation Algorithms for HMM-Based Speech Synthesis and a Constrained SMAPLR Adaptation Algorithm,” Audio, Speech, and Language Processing, IEEE Transactions on , vol. 17, No. 1, pp. 66,83, Jan. 2009.*

* cited by examiner

CORRECTING UNINTELLIGIBLE SYNTHESIZED SPEECH

TECHNICAL FIELD

The present invention relates generally to speech signal processing and, more particularly, to speech synthesis.

BACKGROUND

Speech synthesis is the production of speech from text by artificial means. For example, text-to-speech (TTS) systems synthesize speech from text to provide an alternative to conventional computer-to-human visual output devices like computer monitors or displays. One problem encountered with TTS synthesis is that synthesized speech can have poor prosodic characteristics, such as intonation, pronunciation, stress, speaking rate, tone, and naturalness. Accordingly, such poor prosody can confuse a TTS user and result in incomplete interaction with the user.

SUMMARY

According to one aspect of the invention, there is provided a method of speech synthesis, including the following steps:

(a) receiving a text input in a text-to-speech system;

(b) processing the text input into synthesized speech using a processor of the system;

(c) establishing that the synthesized speech is unintelligible;

(d) reprocessing the text input into subsequent synthesized speech to correct the unintelligible synthesized speech; and (e) outputting the subsequent synthesized speech to a user via a loudspeaker.

According to another embodiment of the invention, there is provided a method of speech synthesis, including the following steps:

(a) receiving a text input in a text-to-speech system;

(b) processing the text input into synthesized speech using a processor of the system;

(c) predicting intelligibility of the synthesized speech;

(d) determining whether the predicted intelligibility from step (c) is lower than a minimum threshold;

(e) outputting the synthesized speech to a user via a loudspeaker if the predicted intelligibility is determined to be not lower than the minimum threshold in step (d);

(f) adapting a model used in conjunction with processing the text input if the predicted intelligibility is determined to be lower than the minimum threshold in step (d);

(g) reprocessing the text input into subsequent synthesized speech;

(h) predicting intelligibility of the subsequent synthesized speech;

(i) determining whether the predicted intelligibility from step (h) is lower than the minimum threshold;

(j) outputting the subsequent synthesized speech to the user via the loudspeaker if the predicted intelligibility is determined to be not lower than the minimum threshold in step (i); and, otherwise (k) repeating steps (f) through (k).

According to a further embodiment of the invention, there is provided a method of speech synthesis, including the following steps:

(a) receiving a text input in a text-to-speech system;

(b) processing the text input into synthesized speech using a processor of the system;

(c1) outputting the synthesized speech to the user via the loudspeaker;

(c2) receiving an indication from the user that the synthesized speech is not intelligible;

(d) reprocessing the text input into subsequent synthesized speech to correct the unintelligible synthesized speech; and (e) outputting the subsequent synthesized speech to a user via a loudspeaker.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The following description describes an example communications system, an example text-to-speech (TTS) system that can be used with the communications system, and one or more example methods that can be used with one or both of the aforementioned systems. The methods described below can be used by a vehicle telematics unit (VTU) as a part of synthesizing speech for output to a user of the VTU. Although the methods described below are such as they might be implemented for a VTU in a vehicle context during program execution or runtime, it will be appreciated that they could be useful in any type of TTS system and other types of TTS systems and for contexts other than the vehicle context.

Communications System

Figure 1:
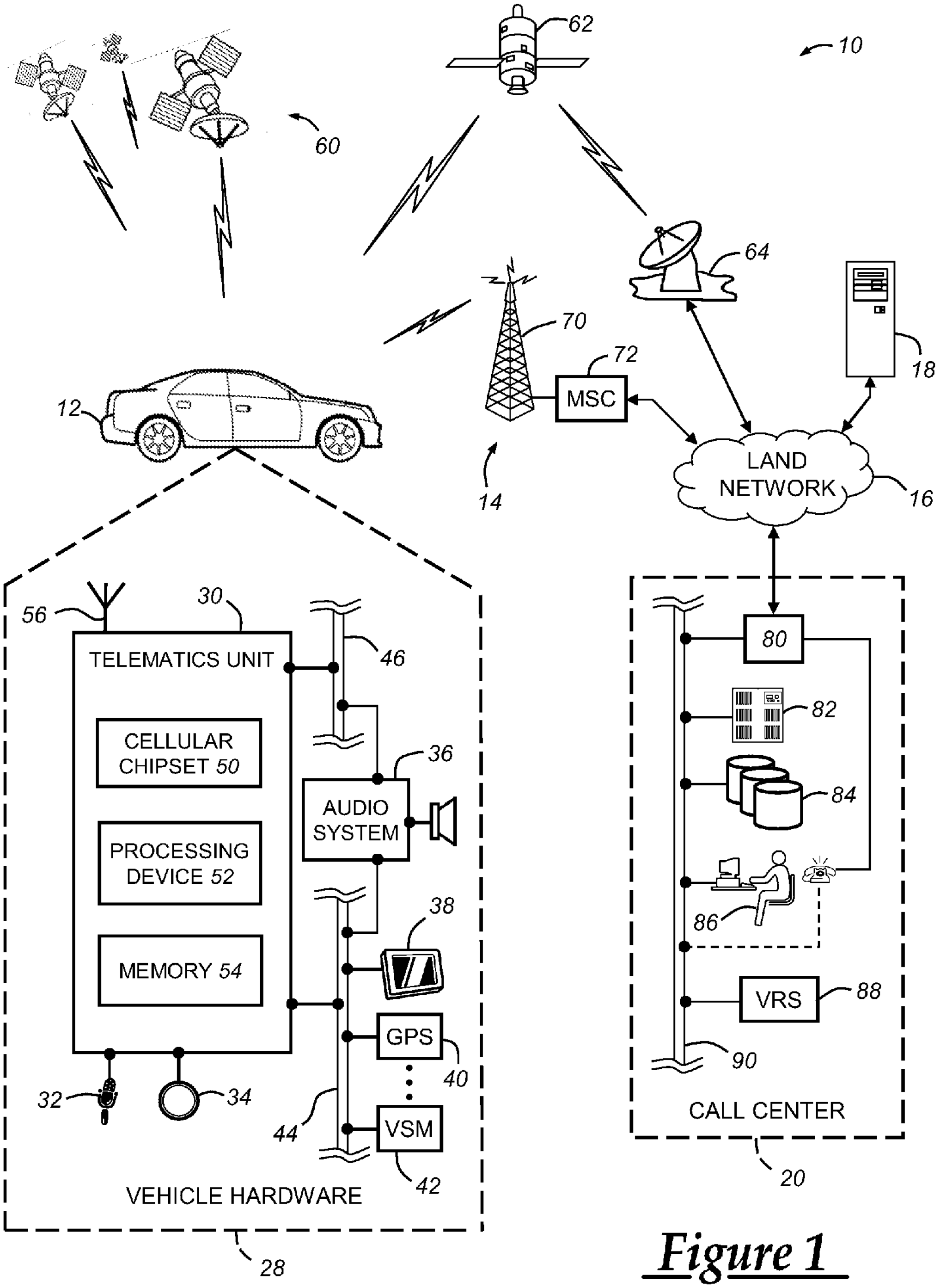
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Speech Synthesis System

Figure 2:
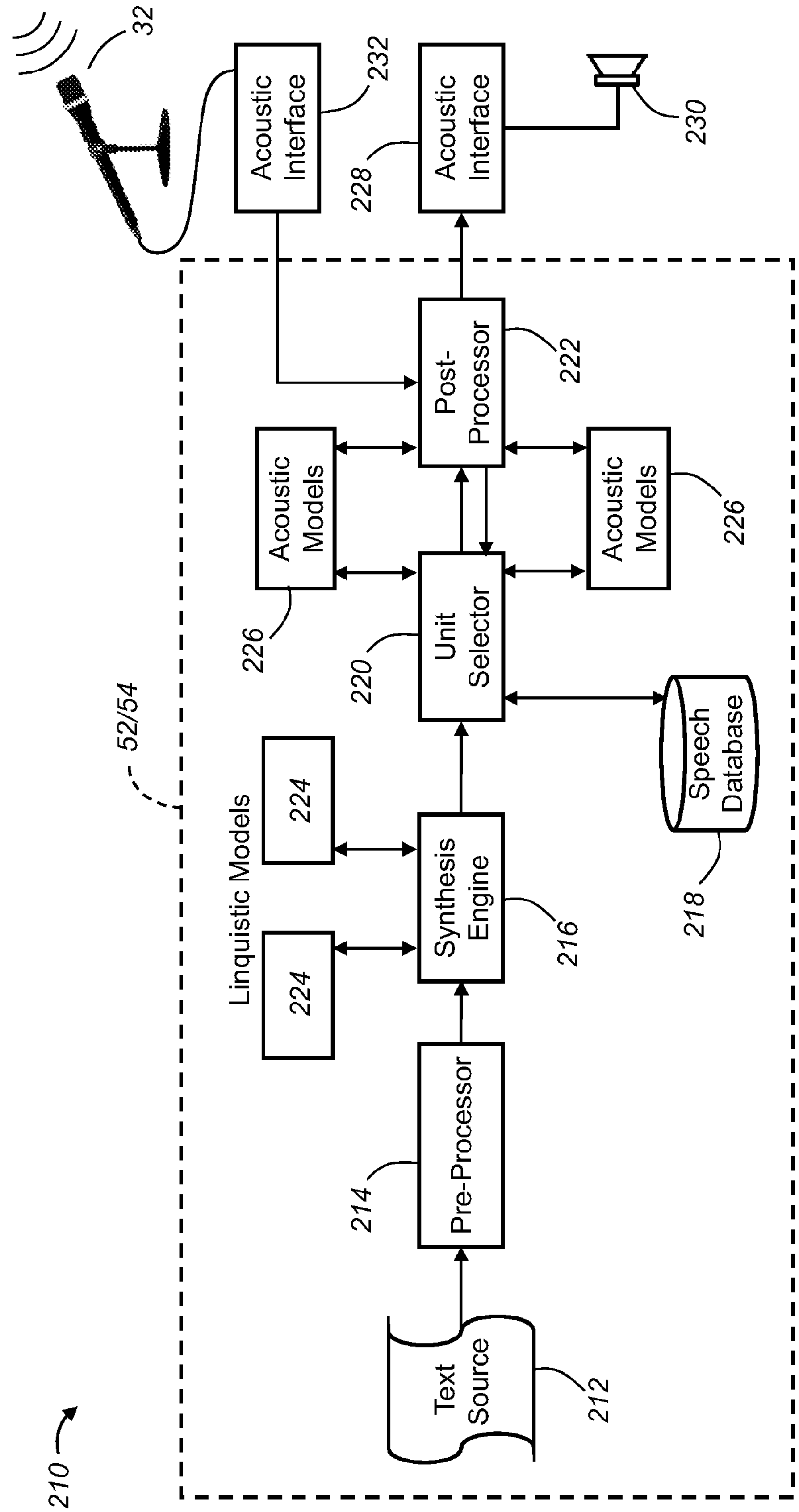
FIG. 2 is a block diagram illustrating an exemplary embodiment of a text-to-speech (TTS) system that can be used with the system of FIG. 1 and for implementing exemplary methods of speech synthesis and/or improving speech recognition.

Turning now to FIG. 2, there is shown an exemplary architecture for a text-to-speech (TTS) system 210 that can be used to enable the presently disclosed method. In general, a user or vehicle occupant may interact with a TTS system to receive instructions from or listen to menu prompts of an application, for example, a vehicle navigation application, a hands free calling application, or the like. There are many varieties of TTS synthesis, including formant TTS synthesis and concatenative TTS synthesis. Formant TTS synthesis does not output recorded human speech and, instead, outputs computer generated audio that tends to sound artificial and robotic. In concatenative TTS synthesis, segments of stored human speech are concatenated and output to produce smoother, more natural sounding speech. Generally, a concatenative TTS system extracts output words or identifiers from a source of text, converts the output into appropriate language units, selects stored units of speech that best correspond to the language units, converts the selected units of speech into audio signals, and outputs the audio signals as audible speech for interfacing with a user.

TTS systems are generally known to those skilled in the art, as described in the background section. But FIG. 2 illustrates an example of an improved TTS system according to the present disclosure. According to one embodiment, some or all of the system 210 can be resident on, and processed using, the telematics unit 30 of FIG. 1. According to an alternative exemplary embodiment, some or all of the TTS system 210 can be resident on, and processed using, computing equipment in a location remote from the vehicle 12, for example, the call center 20. For instance, linguistic models, acoustic models, and the like can be stored in memory of one of the servers 82 and/or databases 84 in the call center 20 and communicated to the vehicle telematics unit 30 for in-vehicle TTS processing. Similarly, TTS software can be processed using processors of one of the servers 82 in the call center 20. In other words, the TTS system 210 can be resident in the telematics unit 30 or distributed across the call center 20 and the vehicle 12 in any desired manner.

The system 210 can include one or more text sources 212, and a memory, for example the telematics memory 54, for storing text from the text source 212 and storing TTS software and data. The system 210 can also include a processor, for example the telematics processor 52, to process the text and function with the memory and in conjunction with the following system modules. A pre-processor 214 receives text from the text source 212 and converts the text into suitable words or the like. A synthesis engine 216 converts the output from the pre-processor 214 into appropriate language units like phrases, clauses, and/or sentences. One or more speech databases 218 store recorded speech. A unit selector 220 selects units of stored speech from the database 218 that best correspond to the output from the synthesis engine 216. A post-processor 222 modifies or adapts one or more of the selected units of stored speech. One or more or linguistic models 224 are used as input to the synthesis engine 216, and one or more acoustic models 226 are used as input to the unit selector 220. The system 210 also can include an acoustic interface 228 to convert the selected units of speech into audio signals and a loudspeaker 230, for example of the telematics audio system, to convert the audio signals to audible speech. The system 210 further can include a microphone, for example the telematics microphone 32, and an acoustic interface 232 to digitize speech into acoustic data for use as feedback to the post-processor 222.

The text source 212 can be in any suitable medium and can include any suitable content. For example, the text source 212 can be one or more scanned documents, text files or application data files, or any other suitable computer files, or the like. The text source 212 can include words, numbers, symbols, and/or punctuation to be synthesized into speech and for output to the text converter 214. Any suitable quantity and type of text sources can be used.

The pre-processor 214 converts the text from the text source 212 into words, identifiers, or the like. For example, where text is in numeric format, the pre-processor 214 can convert the numerals to corresponding words. In another example, where the text is punctuation, emphasized with caps or other special characters like umlauts to indicate appropriate stress and intonation, underlining, or bolding, the pre-processor 214 can convert same into output suitable for use by the synthesis engine 216 and/or unit selector 220.

The synthesis engine 216 receives the output from the text converter 214 and can arrange the output into language units that may include one or more sentences, clauses, phrases, words, subwords, and/or the like. The engine 216 may use the linguistic models 224 for assistance with coordination of most likely arrangements of the language units. The linguistic models 224 provide rules, syntax, and/or semantics in arranging the output from the text converter 214 into language units. The models 224 can also define a universe of language units the system 210 expects at any given time in any given TTS mode, and/or can provide rules, etc., governing which types of language units and/or prosody can logically follow other types of language units and/or prosody to form natural sounding speech. The language units can be comprised of phonetic equivalents, like strings of phonemes or the like, and can be in the form of phoneme HMM's.

The speech database 218 includes pre-recorded speech from one or more people. The speech can include pre-recorded sentences, clauses, phrases, words, subwords of pre-recorded words, and the like. The speech database 218 can also include data associated with the pre-recorded speech, for example, metadata to identify recorded speech segments for use by the unit selector 220. Any suitable type and quantity of speech databases can be used.

The unit selector 220 compares output from the synthesis engine 216 to stored speech data and selects stored speech that best corresponds to the synthesis engine output. The speech selected by the unit selector 220 can include pre-recorded sentences, clauses, phrases, words, subwords of pre-recorded words, and/or the like. The selector 220 may use the acoustic models 226 for assistance with comparison and selection of most likely or best corresponding candidates of stored speech. The acoustic models 226 may be used in conjunction with the selector 220 to compare and contrast data of the synthesis engine output and the stored speech data, assess the magnitude of the differences or similarities therebetween, and ultimately use decision logic to identify best matching stored speech data and output corresponding recorded speech.

In general, the best matching speech data is that which has a minimum dissimilarity to, or highest probability of being, the output of the synthesis engine 216 as determined by any of various techniques known to those skilled in the art. Such techniques can include dynamic time-warping classifiers, artificial intelligence techniques, neural networks, free phoneme recognizers, and/or probabilistic pattern matchers such as Hidden Markov Model (HMM) engines. HMM engines are known to those skilled in the art for producing multiple TTS model candidates or hypotheses. The hypotheses are considered in ultimately identifying and selecting that stored speech data which represents the most probable correct interpretation of the synthesis engine output via acoustic feature analysis of the speech. More specifically, an HMM engine generates statistical models in the form of an "N-best" list of language unit hypotheses ranked according to HMM-calculated confidence values or probabilities of an observed sequence of acoustic data given one or another language units, for example, by the application of Bayes' Theorem.

In one embodiment, output from the unit selector 220 can be passed directly to the acoustic interface 228 or through the post-processor 222 without post-processing. In another embodiment, the post-processor 222 may receive the output from the unit selector 220 for further processing.

In either case, the acoustic interface 228 converts digital audio data into analog audio signals. The interface 228 can be a digital to analog conversion device, circuitry, and/or software, or the like. The loudspeaker 230 is an electroacoustic transducer that converts the analog audio signals into speech audible to a user and receivable by the microphone 32.

Methods

Figure 3:
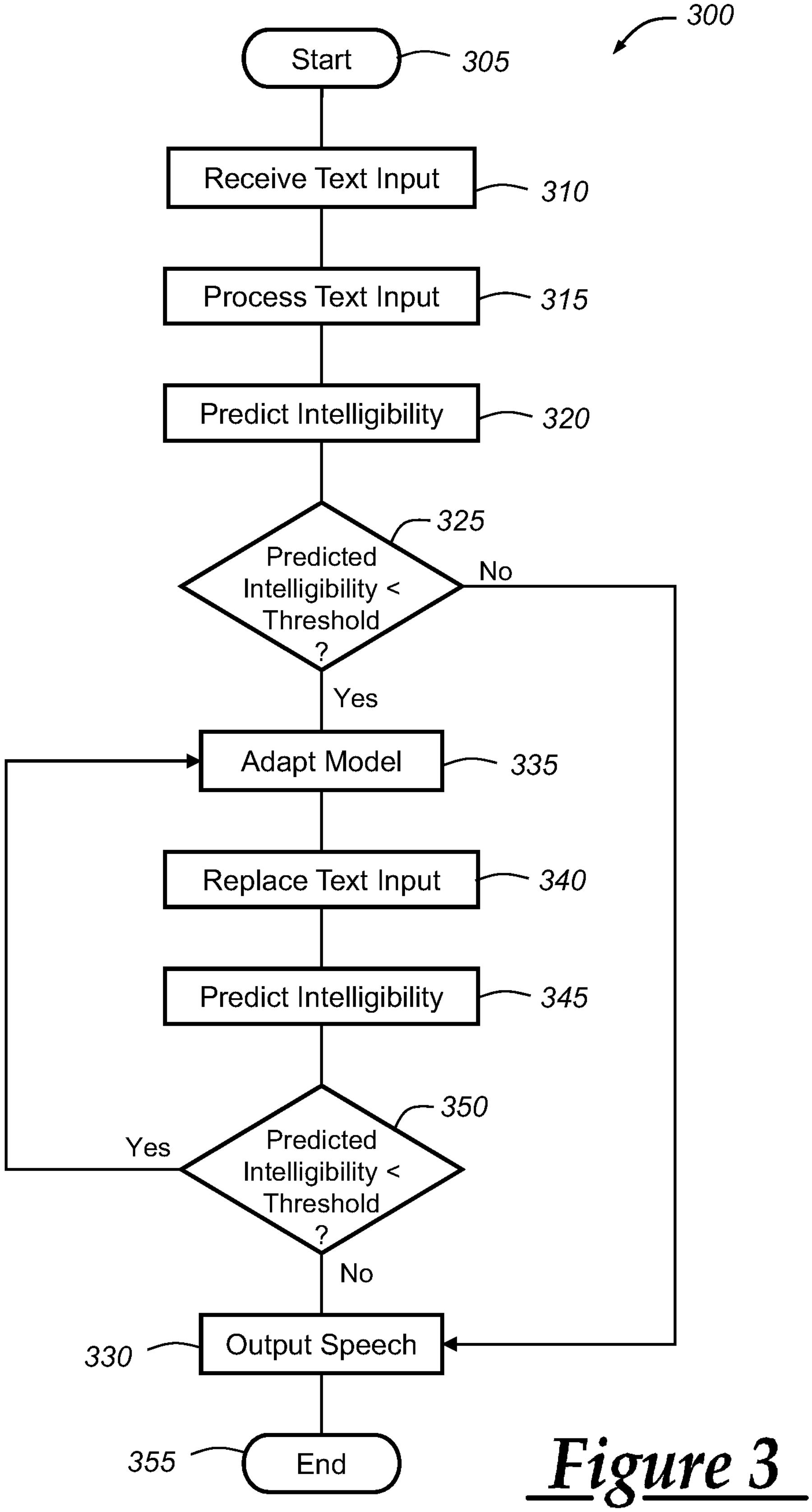
FIG. 3 is a flow chart illustrating an exemplary embodiment of a method of speech synthesis that can be carried out by the communication system of FIG. 1, and the TTS system of FIG. 2.

Turning now to FIG. 3, there is shown a speech synthesis method 300. The method 300 of FIG. 3 can be carried out using suitable programming of the TTS system 210 of FIG. 2 within the operating environment of the vehicle telematics unit 30 as well as using suitable hardware and programming of the other components shown in FIG. 1. These features of any particular implementation will be known to those skilled in the art based on the above system description and the discussion of the method described below in conjunction with the remaining figures. Those skilled in the art will also recognize that the method can be carried out using other TTS systems within other operating environments.

In general, the method 300 includes receiving a text input in a text-to-speech system, processing the text input into synthesized speech, establishing the synthesized speech as unintelligible, and reprocessing the text input into subsequent synthesized speech, which is output to a user via a loudspeaker. The synthesized speech can be established as unintelligible by predicting intelligibility of the synthesized speech, and determining that the predicted intelligibility is lower than a minimum threshold.

Referring again to FIG. 3, the method 300 begins in any suitable manner at step 305. For example, a vehicle user starts interaction with the user interface of the telematics unit 30, preferably by depressing the user interface pushbutton 34 to begin a session in which the user receives TTS audio from the telematics unit 30 while operating in a TTS mode. In one exemplary embodiment, the method 300 may begin as part of a navigational routing application of the telematics unit 30.

At step 310, a text input is received in a TTS system. For example, the text input can include a string of letters, numbers, symbols, or the like from the text source 212 of the TTS system 210.

At step 315, the text input is processed into synthesized speech using a processor of the system. First, for example, the text input can be pre-processed to convert the text input into output suitable for speech synthesis. For example, the pre-processor 214 can convert text received from the text source 212 into words, identifiers, or the like for use by the synthesis engine 216. Second, for example, the output from can be arranged into language units. For example, the synthesis engine 216 can receive the output from the text converter 214 and, with the linguistic models 224, can arrange the output into language units that may include one or more sentences, clauses, phrases, words, subwords, and/or the like. The language units can be comprised of phonetic equivalents, like strings of phonemes or the like. Third, for example, language units can be compared to stored data of speech, and the speech that best corresponds to the language units can be selected as speech representative of the input text. For example, the unit selector 220 can use the acoustic models 228 to compare the language units output from the synthesis engine 216 to speech data stored in the first speech database **218*a*** and select stored speech having associated data that best corresponds to the synthesis engine output.

At step 320, intelligibility of the synthesized speech from step 315 can be predicted. Any of several available and well known methods of predicting speech intelligibility can be used. For example, the Articulation Index (AI) may be used to predict the intelligibility of speech in a specific listening condition such as in a room with a given level of background noise at a given level of speech intensity. AI is a function of the amplitude spectrum of a speech signal, and the amount of that spectrum that exceeds a threshold level of background noise. AI may be measured on a scale of 0 to 1. In another example, the Speech Transmission Index (STI) may be used to express the ability of a communication channel, like a system or room, to carry information contained in speech and is an indirect measure of speech intelligibility. STI may be measured on a scale of 0 to 1. In a further example, the Speech Interference Level (SIL) may be used to characterize noise in the frequency range where the human ear has its highest sensitivity, and is calculated from sound pressure levels measured in octave bands. SIL may be measured on a scale of 600 to 4800 Hz, which may include several octave bands like 600-1200 Hz, 1200-2400 Hz, and 2400-4800 Hz. Also, SIL may include average levels of the octave bands.

The speech intelligibility can be predicted using one or more of the aforementioned indices in any suitable manner. For example, two or more of the indices may be used and each may be averaged, or may weighted in any suitable manner, for instance, to reflect a greater predictive ability of one index over another. More specifically, two or more of the indices may be used in a multiple regression model that may be developed in terms of subjective mean opinion scores to calculate appropriate weights for the model. Any suitable techniques may be used in developing the model including, minimum mean square error, least square estimate, or the like.

At step 325, it can be determined whether the predicted intelligibility from step 320 is lower than a minimum threshold. Just to illustrate, the minimum threshold for AI and/or STI may be 0.8 on the scale of 0 to 1.

At step 330, the synthesized speech can be output to a user via a loudspeaker if the predicted intelligibility is determined to be not lower than the minimum threshold in step 325. For example, if the predicted intelligibility is 0.9; greater than the illustrative minimum threshold of 0.8, then the speech is output to the user. For instance, the pre-recorded speech from the user that is selected from the database 218 by the selector 220 can be output through the interface 228 and speaker 230.

At step 335, a model used in conjunction with processing the text input can be adapted if the predicted intelligibility is determined to be lower than the minimum threshold in step 325. For example, if the predicted intelligibility is 0.6; less than the illustrative minimum threshold of 0.8, then the model can be adapted. For instance, one or more acoustic models 226 can include TTS Hidden Markov Models (HMMs) that can be adapted in any suitable manner. The models can be adapted at the telematics unit 30 or at the call center 20.

In a more specific example, the models can be adapted using Maximum Likelihood Linear Regression (MLLR) algorithms using different variants of prosodic attributes including intonation, speaking rate, spectral energy, pitch, stress, pronunciation, and/or the like. The relationship between two or more of the various attributes and the speech intelligibility (SI) can be defined in any suitable manner. For example, an SI score may be calculated as a sum of weighted prosodic attributes according to a formula, for instance, SI=a*stress+b*intonation+c*speaking rate. The models can be estimated using a gaussian probability density function representing the attributes, wherein the weights a, b, c, can be modified until a most likely model is obtained to result in an SI greater than the minimum threshold. Gaussian mixture models and parameters can be estimated using a maximum likelihood regression algorithm, or any other suitable technique.

Each of the MLLR features can be weighted in any suitable manner, for instance, to reflect a greater correlation of one feature over another. In one embodiment, selection and weighting of the features can be carried out in advance of speech recognition runtime during speech recognition model development. In another embodiment, selection and weighting of the features can be carried out during speech recognition runtime. Weighting can be carried out using a Minimum Mean Squared Error (MMSE) iterative algorithm, a neural network trained in a development stage, or the like.

At step 340, the text input can be reprocessed into subsequent synthesized speech to correct the unintelligible synthesized speech. For example, the model adapted in step 335 can be used to reprocess the text input so that the subsequent synthesized speech is intelligible. As discussed previously herein with respect to the TTS system 210, the post-processor 222 can be used to modify stored speech in any suitable manner. As shown in dashed lines, the adapted TTS HMMs can be fed back upstream to improve selection of subsequent speech.

At step 345, intelligibility of the subsequent synthesized speech can be predicted, for example, as discussed above with respect to step 320.

At step 350, it can be determined whether the predicted intelligibility from step 345 is lower than a minimum threshold. If not, then the method proceeds to step 330. But, if so, then the method loops back to step 335.

At step 355, the method may end in any suitable manner.

Figure 4:
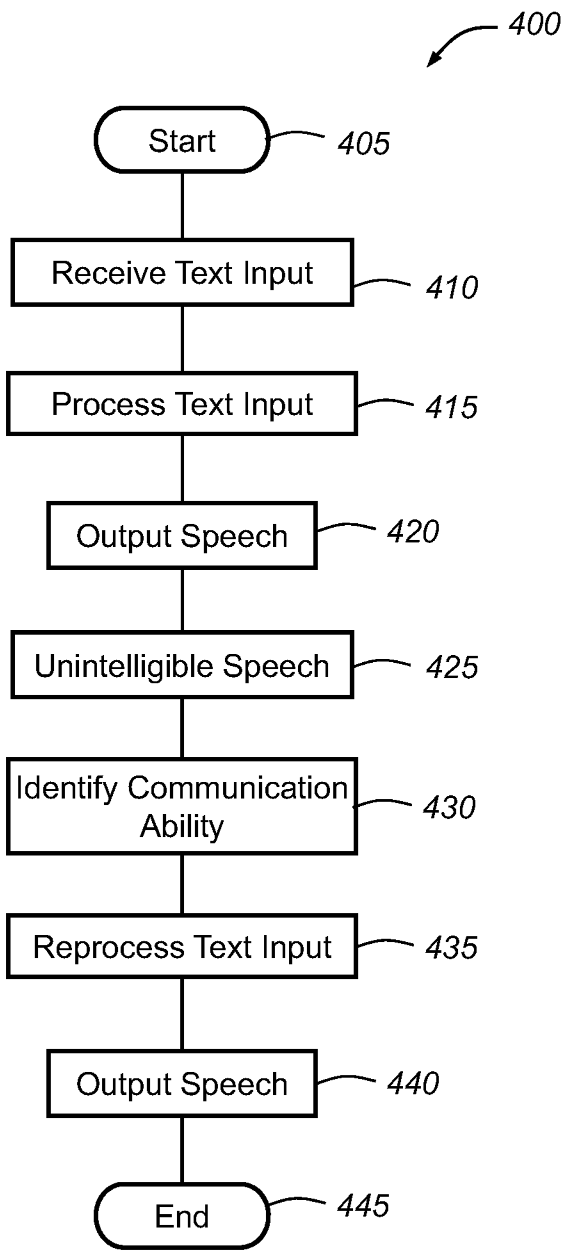
FIG. 4 is a flow chart illustrating another exemplary embodiment of a method of speech synthesis that can be carried out by the communication system of FIG. 1, and the TTS system of FIG. 2.

Turning now to FIG. 4, there is shown another speech synthesis method 400. The method 400 of FIG. 4 can be carried out using suitable programming of the TTS system 210 of FIG. 2 within the operating environment of the vehicle telematics unit 30 as well as using suitable hardware and programming of the other components shown in FIG. 1. These features of any particular implementation will be known to those skilled in the art based on the above system description and the discussion of the method described below in conjunction with the remaining figures. Those skilled in the art will also recognize that the method can be carried out using other TTS systems within other operating environments.

In general, the method 400 includes receiving a text input in a text-to-speech system, processing the text input into synthesized speech, establishing the synthesized speech as unintelligible, and reprocessing the text input into subsequent synthesized speech, which is output to a user via a loudspeaker. The synthesized speech can be established as unintelligible by outputting the synthesized speech to the user via the loudspeaker, and receiving an indication from the user that the synthesized speech is not intelligible.

Referring again to FIG. 4, the method 400 begins in any suitable manner at step 405, for example, as discussed above with respect to step 305.

At step 410, a text input is received in a TTS system, for example, as discussed above with respect to step 310.

At step 415, the text input is processed into synthesized speech using a processor of the system, for example, as discussed above with respect to step 315.

At step 420, the synthesized speech is output to the user via a loudspeaker, for example, as discussed above with respect to step 350.

At step 425, an indication can be received from the user that the synthesized speech is not intelligible. For example, the user may utter any suitable indicator including "pardon?" or "what?" or "repeat" or the like. The indication may be received by the telematics microphone 32 of the telematics unit 30 and passed along to a speech recognition system for recognition of the indication in any suitable manner. Speech recognition and related systems are well known in the art as evidenced by U.S. Patent Application Publication No. 2011/0144987, which is assigned to the assignee hereof and is hereby incorporated by reference in its entirety. Thereafter, the recognized indication may be passed along to the TTS system 210 in any suitable manner.

At step 430, a communication ability of the user can be identified. For example, the user may be identified as being a novice, an expert, a native speaker, a non-native speaker, or the like. Techniques for distinguishing native speakers from non-native speakers and novice speakers from expert speakers are well known to those of ordinary skill in the art. However, a preferred technique may be based on detection of different pronunciation of words in a given lexicon in the ASR system.

At step 435, the text input can be reprocessed into subsequent synthesized speech to correct the unintelligible synthesized speech. In one example, the subsequent synthesized speech can be slower than the synthesized speech. More specifically, a speaking rate associated with the subsequent synthesized speech can be lower than that associated with the synthesized speech. In another example, the subsequent synthesized speech can be simpler to understand than the synthesized speech. More specifically, the subsequent synthesized speech can be more verbose than the preceding synthesized speech for greater context and understanding. For instance, synthesized speech verbiage such as "Number Please" can be replaced with subsequent synthesized speech such as "Please Say A Contact Name For The Person You Are Trying To Call."

In one embodiment, the subsequent synthesized speech is produced based on the communication ability of the user identified in step 430. For example, if the user is identified as a novice or a non-native speaker, then the subsequent synthesized speech can be simpler and/or slower. In another example, if the user is identified as a novice or non-native speaker, then the subsequent synthesized speech can include verbiage that is different from the previous speech output.

At step 440, the subsequent synthesized speech can be output to a user via a loudspeaker, for example, as discussed above with respect to step 350.

At step 445, the method may end in any suitable manner.

The method or parts thereof can be implemented in a computer program product including instructions carried on a computer readable medium for use by one or more processors of one or more computers to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of executing instructions corresponding to one or more steps of the disclosed method.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the invention can be applied to other fields of speech signal processing, for instance, mobile telecommunications, voice over internet protocol applications, and the like. All such other embodiments, changes, and modifications are intended to come within the scope of the appended claims.

As used in this specification and claims, the terms “for example,” “for instance,” “such as,” and “like,” and the verbs “comprising,” “having,” “including,” and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of speech synthesis, comprising the steps of:

(a) receiving a text input in a text-to-speech system;

(b) processing the text input into synthesized speech using a processor of the system;

(c) establishing that the synthesized speech is unintelligible;

(d) reprocessing the text input into subsequent synthesized speech to correct the unintelligible synthesized speech; and (e) outputting the subsequent synthesized speech to a user via a loudspeaker.

2. The method of claim 1 wherein step (c) includes:

(c1) predicting intelligibility of the synthesized speech; and (c2) determining that the predicted intelligibility from step (c1) is lower than a minimum threshold.

3. The method of claim 2 further comprising, between steps (c) and (d):

(f) adapting a model used in conjunction with step (d).

4. The method of claim 3 further comprising, after step (e):

(g) predicting intelligibility of the subsequent synthesized speech;

(h) determining whether the predicted intelligibility from step (g) is lower than the minimum threshold;

(i) outputting the subsequent synthesized speech to the user via the loudspeaker if the predicted intelligibility is determined to be not lower than the minimum threshold in step (h); and, otherwise (j) repeating steps (f) through (j).

5. The method of claim 1 wherein step (c) includes:

(c1) outputting the synthesized speech to the user via the loudspeaker; and (c2) receiving an indication from the user that the synthesized speech is not intelligible.

6. The method of claim 5 wherein in step (d) the subsequent synthesized speech is simpler than the synthesized speech.

7. The method of claim 5 wherein in step (d) the subsequent synthesized speech is slower than the synthesized speech.

8. The method of claim 5 further comprising identifying a communication ability of the user, wherein in step (d) the subsequent synthesized speech is produced based on the identified communication ability.

9. The method of claim 8 wherein in step (d) the subsequent synthesized speech is slower than the synthesized speech.

10. The method of claim 9 wherein in step (d) the subsequent synthesized speech is simpler than the synthesized speech.

11. A method of speech synthesis, comprising the steps of:

(a) receiving a text input in a text-to-speech system;

(b) processing the text input into synthesized speech using a processor of the system;

(c) predicting intelligibility of the synthesized speech;

(d) determining whether the predicted intelligibility from step (c) is lower than a minimum threshold;

(e) outputting the synthesized speech to a user via a loudspeaker if the predicted intelligibility is determined to be not lower than the minimum threshold in step (d);

(f) adapting a model used in conjunction with processing the text input if the predicted intelligibility is determined to be lower than the minimum threshold in step (d);

(g) reprocessing the text input into subsequent synthesized speech;

(h) predicting intelligibility of the subsequent synthesized speech;

(i) determining whether the predicted intelligibility from step (h) is lower than the minimum threshold;

(j) outputting the subsequent synthesized speech to the user via the loudspeaker if the predicted intelligibility is determined to be not lower than the minimum threshold in step (i); and, otherwise (k) repeating steps (f) through (k).

12. The method of claim 11, wherein the model in step (f) is a Hidden Markov Model that is adapted using a Maximum Likelihood Linear Regression algorithm.

13. The method of claim 11 wherein the predicting intelligibility step includes calculating a speech intelligibility score including a sum of weighted prosodic attributes.

14. The method of claim 13 wherein the weighted prosodic attributes include at least two of intonation, speaking rate, spectral energy, pitch, or stress.

15. The method of claim 13 wherein the adapted model is based on at least one of an articulation index, a speech transmission index, or a speech interference level.

16. The method of claim 11 wherein the adapted model is based on at least one of an articulation index, a speech transmission index, or speech interference level.

17. A method of speech synthesis, comprising the steps of:

(a) receiving a text input in a text-to-speech system;

(b) processing the text input into synthesized speech using a processor of the system;

(c1) outputting the synthesized speech to the user via a loudspeaker;

(c2) receiving an indication from the user that the synthesized speech is not intelligible;

(d) reprocessing the text input into subsequent synthesized speech to correct the unintelligible synthesized speech; and (e) outputting the subsequent synthesized speech to a user via a loudspeaker.

18. The method of claim 17 further comprising identifying a communication ability of the user, wherein in step (d) the subsequent synthesized speech is produced based on the identified communication ability.

19. The method of claim 17 wherein in step (d) the subsequent synthesized speech is simpler than the synthesized speech.

20. The method of claim 17 wherein in step (d) the subsequent synthesized speech is slower than the synthesized speech.

* * * * *